United States Patent
Tomita et al.

(10) Patent No.: US 9,184,524 B2
(45) Date of Patent: Nov. 10, 2015

(54) SOLENOID

(71) Applicants: DENSO CORPORATION, Kariya, Aichi-pref. (JP); HAMANAKODENSO CO., LTD., Kosai, Shizuoka-pref. (JP)

(72) Inventors: Masahiro Tomita, Obu (JP); Keita Okada, Chita-gun (JP); Junichi Nakahira, Kariya (JP)

(73) Assignees: DENSO CORPORATION, Kariya (JP); HAMANAKODENSO CO., LTD., Kosai (JP)

( * ) Notice: Subject to any disclaimer, the term of this patent is extended or adjusted under 35 U.S.C. 154(b) by 0 days.

(21) Appl. No.: 14/010,995

(22) Filed: Aug. 27, 2013

(65) Prior Publication Data
US 2014/0065895 A1   Mar. 6, 2014

(30) Foreign Application Priority Data

Aug. 28, 2012   (JP) ................................. 2012-187249

(51) Int. Cl.
| | |
|---|---|
| H01F 7/20 | (2006.01) |
| H01R 13/02 | (2006.01) |
| H01F 7/16 | (2006.01) |
| H01F 7/06 | (2006.01) |
| F16K 27/02 | (2006.01) |

(Continued)

(52) U.S. Cl.
CPC .............. *H01R 13/02* (2013.01); *F16K 27/029* (2013.01); *F16K 27/048* (2013.01); *F16K 31/0675* (2013.01); *H01F 7/06* (2013.01); *H01F 7/16* (2013.01); *H01F 2007/062* (2013.01)

(58) Field of Classification Search
CPC .................................... H01R 4/24; B60T 8/36
USPC ........................................................... 335/294
See application file for complete search history.

(56) References Cited

U.S. PATENT DOCUMENTS

| | | | | |
|---|---|---|---|---|
| 6,985,060 | B2 * | 1/2006 | Parker et al. | 335/282 |
| 7,468,647 | B2 * | 12/2008 | Ishibashi et al. | 335/281 |
| 8,534,641 | B2 * | 9/2013 | Schalowski et al. | 251/129.15 |

(Continued)

FOREIGN PATENT DOCUMENTS

| | | |
|---|---|---|
| CN | 102606789 A | 7/2012 |
| KR | 2009-0084753 | 8/2009 |

OTHER PUBLICATIONS

Chinese Office Action dated Aug. 12, 2015 in corresponding CN Application No. 201310378548.5.

*Primary Examiner* — Shawki S Ismail
*Assistant Examiner* — Lisa Homza
(74) *Attorney, Agent, or Firm* — Nixon & Vanderhye P.C.

(57) ABSTRACT

A solenoid includes a coil, an after-formation terminal, and a yoke. The after-formation terminal includes an internal connection part and an external connection part. The internal connection part is conductively-joined to a conductor from which the coil is formed, or to a conductor which is connected to the coil. The external connection part is fitted and connected to a counterpart terminal. The yoke forms a magnetic circuit together with the coil. The after-formation terminal is disposed at an upper surface of the yoke. The external connection part is configured integrally with the internal connection part. The after-formation terminal is formed through application of bending or twisting to an intermediate part between the internal connection part and the external connection part of a before-formation terminal, which projects outward from the upper surface of the yoke in a direction of a central axis of the coil.

13 Claims, 8 Drawing Sheets

(51) Int. Cl.
*F16K 31/06* (2006.01)
*F16K 27/04* (2006.01)

(56) References Cited

U.S. PATENT DOCUMENTS

| 2002/0093411 | A1 | 7/2002 | Lewin et al. |
| 2004/0089832 | A1* | 5/2004 | Wilde et al. ............... 251/129.15 |
| 2005/0062005 | A1* | 3/2005 | Shimura et al. ........... 251/129.15 |
| 2005/0201867 | A1* | 9/2005 | Hirota ........................ 417/222.2 |
| 2006/0132268 | A1 | 6/2006 | Hirabayashi |
| 2006/0243938 | A1* | 11/2006 | Ishibashi et al. ......... 251/129.15 |
| 2009/0130868 | A1 | 5/2009 | Schenk et al. |
| 2010/0218366 | A1 | 9/2010 | Yoshimori |

* cited by examiner

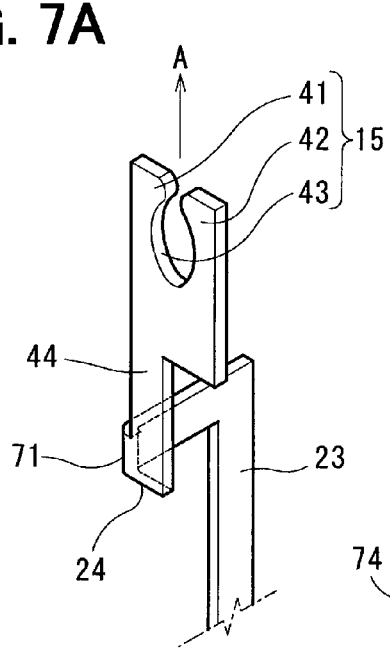
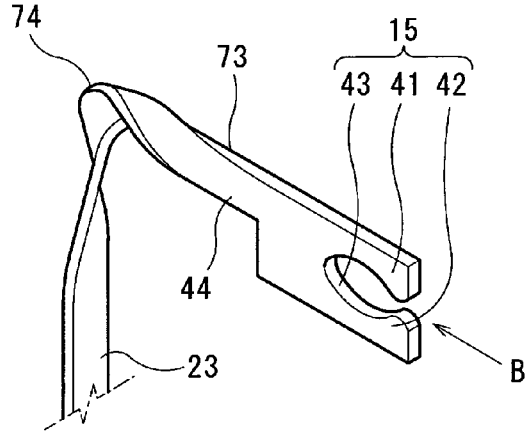
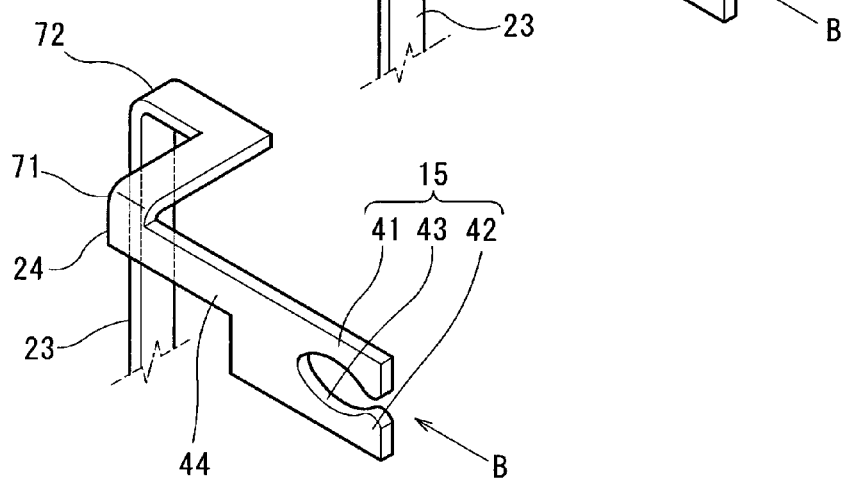

SOLENOID

CROSS REFERENCE TO RELATED APPLICATION

This application is based on Japanese Patent Application No. 2012-187249 filed on Aug. 28, 2012, the disclosure of which is incorporated herein by reference.

TECHNICAL FIELD

The present disclosure relates to a solenoid with a terminal having a tuning fork terminal (female terminal) which is fitted and connected to a tab terminal (male terminal) of a counterpart terminal. In particular, the present disclosure relates to a solenoid used for an electromagnetic actuator that drives a movable body.

BACKGROUND

Conventionally, as illustrated in FIG. 9, there is known an electromagnetic actuator (hereinafter referred to as a solenoid) for displacing a spool valve J1 which is a valving element of a spool control valve through a spool hole J3 of a sleeve J2 toward an adjust screw J4 (toward an opening of the spool hole J3) (see, for example, Korean patent application publication No. 10-2009-0084753). For this solenoid, there is known a solenoid including a plunger 101, a coil inner peripheral side fixed core (cylindrical stator cores 102, 103, magnetic resistance part 104), a coil outer peripheral side fixed core (cylindrical yoke 105 with a bottom), a coil 106, first and second terminals 107, 108, and a terminal holder 109 (see, for example, Korean patent application publication No. 10-2009-0084753).

The first terminal 107 is used as a coil terminal on the coil side having an internal joining part that is conduction-joined to an electric conductor (conducting wire) which is formed into the coil 106. The second terminal 108 is used as an outer side coil terminal having a tuning fork terminal that is fitted and connected to a tab terminal of a counterpart terminal, and an intermediate joining part that is conduction-joined to the terminal 107 by, for example, welding or crimping.

Points at issue of the conventional technology will be described below. In the conventional solenoid, the coil terminals have two divided structures of the first terminal 107 and the second terminal 108 which are integrated by a conduction joining means (e.g., welding or crimping). Accordingly, reliability in energization (conduction) of an internal connection part between the first terminal 107 and the second terminal 108 is not easily ensured.

An insertion hole 113 is formed through an outer surface (yoke upper surface 112) of a bottom wall portion 111 of the yoke 105. The terminal holder 109 is snap-fit joined to the yoke upper surface 112 such that an end part (snap fitting pawl part 115) of a resilient engagement piece 114 projecting from the terminal holder 109 toward the yoke is hooked on an engagement part 116 provided on an inner surface of the bottom wall portion 111 of the yoke 105. As above, since the method of fixing the terminal holder 109 to the yoke 105 is snap-fit joining, backlash is necessarily caused at a snap-fit joined portion. Because of this backlash of the snap-fit joining, there are caused a position shift of the internal connection part between the first terminal 107 and the second terminal 108, and a position shift of an external connection part between the second terminal 108 and the counterpart terminal. As a result, there is an issue that it is more difficult to ensure reliability in energization (conduction) at the internal connection part and the external connection part.

SUMMARY

The present disclosure addresses at least one of the above issues.

According to the present disclosure, there is provided a solenoid including a coil, an after-formation terminal, and a yoke. The after-formation terminal includes an internal connection part and an external connection part. The internal connection part is conductively-joined to a conductor from which the coil is formed, or to a conductor which is connected to the coil. The external connection part is fitted and connected to a counterpart terminal. The yoke has a cylindrical shape with a bottom and is configured to form a magnetic circuit together with the coil. The after-formation terminal is disposed at an upper surface of the yoke. The external connection part is configured integrally with the internal connection part. The after-formation terminal is obtained as a result of application of bending or twisting to a before-formation terminal, which projects outward from the upper surface of the yoke in a direction of a central axis of the coil. The after-formation terminal is formed through application of bending or twisting to an intermediate part between the internal connection part and the external connection part of the before-formation terminal.

BRIEF DESCRIPTION OF THE DRAWINGS

The above and other objects, features and advantages of the present disclosure will become more apparent from the following detailed description made with reference to the accompanying drawings. In the drawings:

FIG. 7A is a diagram illustrating a bending process of a terminal of a linear solenoid in accordance with a third embodiment;

FIG. 7B is a diagram illustrating the bending process of the terminal of the linear solenoid of the third embodiment;

FIG. 7C is a diagram illustrating the bending process of the terminal of the linear solenoid of the third embodiment;

DETAILED DESCRIPTION

Figure 1A:
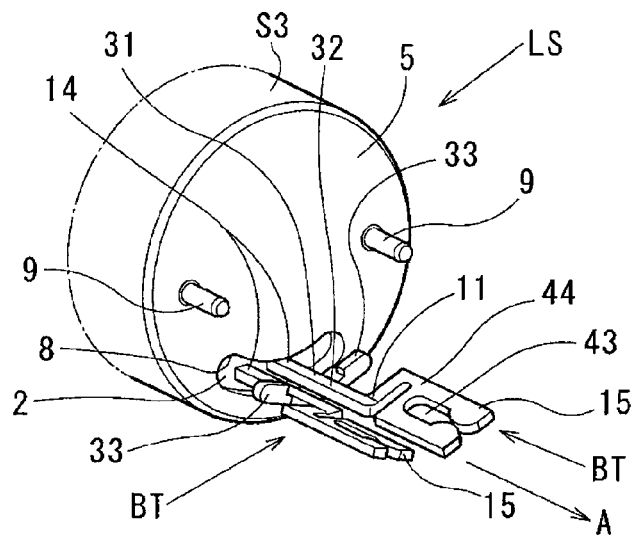
FIG. 1A is a diagram illustrating a bending process of a terminal of a linear solenoid in accordance with a first embodiment.
Figure 1B:
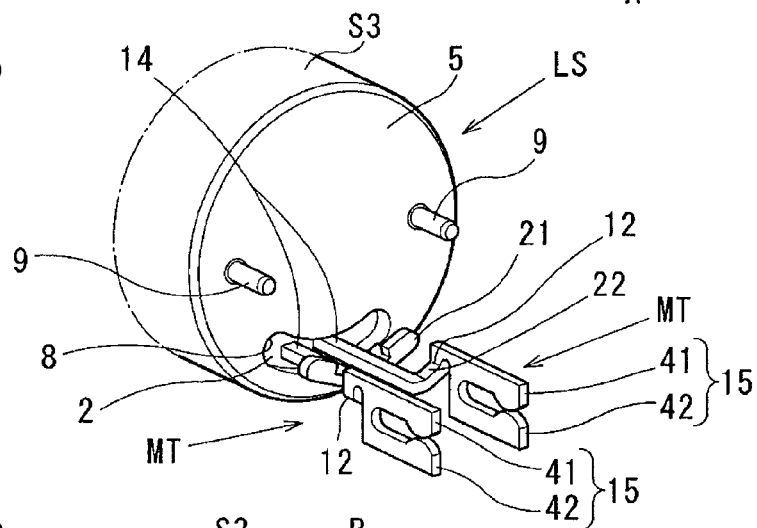
FIG. 1B is a diagram illustrating the bending process of the terminal of the linear solenoid of the first embodiment.

Embodiments will be described in detail below with reference to the accompanying drawings.
(First Embodiment)

Configuration of a first embodiment will be described below. FIGS. 1A to 5B illustrate structure of a terminal of a linear solenoid of the first embodiment to which the present disclosure is applied.

A hydraulic control system of the present embodiment is used for transmission control of an automatic transmission disposed in a vehicle such as an automobile. A housing of the automatic transmission is configured by combination of an automatic transmission case (transmission case) and an oil pan. A torque converter constituted of a pump, a turbine, a stator and so forth, and a multi-stage gear type transmission mechanism connected to the turbine of this torque converter are accommodated in the automatic transmission case. The transmission mechanism includes friction engagement elements (clutch or brake) engaged or disengaged in accordance with an oil pressure supplied from the hydraulic control system. In the automatic transmission, a shift range is switched in accordance with a combination of the engagement and disengagement of the friction engagement elements. Accordingly, the transmission control of the automatic transmission is carried out.

The hydraulic control system for the automatic transmission includes an oil pump that draws in oil in the oil pan to pressure-feed the oil, a valve body including oil passages, electromagnetic hydraulic control valves that are attached to this valve body to constitute a hydraulic circuit together with the oil passages of the valve body, and a control unit (TCU) that controls the electromagnetic hydraulic control valves to realize a shift condition required by, for example, a driver. The oil pump is a hydraulic pressure generating means that is rotated by a crankshaft (or electric motor) of an engine. An oil supply flow passage (oil passage) is connected to a discharge side of this oil pump.

At least one electromagnetic hydraulic control valve (electromagnetic spool control valve: hereinafter referred to as an electromagnetic valve) of the electromagnetic hydraulic control valves is constituted of a spool valve (spool control valve) for regulating an oil pressure of operating oil (oil) used for the automatic transmission to output the pressure, and a linear solenoid LS which is an electromagnetic actuator for driving this spool valve. The spool valve includes a cylindrical sleeve fitted into a recessed part of the valve body, a spool supported in a spool hole of this sleeve to be capable of (slidably) reciprocating, and a return spring for urging this spool toward the linear solenoid side (default position side).

The sleeve includes ports that communicate between inside and outside of the sleeve and extend in a radial direction perpendicular to an axial direction of the spool hole. The ports include an input port which is connected to a downstream end of the oil supply flow passage and into which oil is pressure-fed from the oil pump, an output port from which the output pressure which is regulated at the spool valve is outputted, a feedback port which communicates with this output port to feed back the spool, and a drain port for discharging oil into a low-pressure side (e.g., oil pan).

The spool constitutes a valving element of the spool valve (valve main body), and fitted and supported in the spool hole of the sleeve to be capable of slidably reciprocating. This spool is in contact with one axial end surface of a shaft extending from the inside of the spool hole to the inside of the linear solenoid LS. The other axial end face of this shaft is in contact with a contact part of a plunger S1. Accordingly, the spool valve is configured to drive the spool in its axial direction through the shaft as a result of displacement of the plunger S1 in its axial direction.

The linear solenoid LS includes the plunger (movable core) S1 made of a magnetic material that is connected to the spool via the shaft made of a non-magnetic material to be movable integrally with the spool, a solenoid coil (hereinafter referred to as a coil) SC that generates magnetic flux therearound upon energization, a coil bobbin (hereinafter referred to as a bobbin 2) made of synthetic resin for embedding and fixing a part of a pair of coil lead wires 1 pulled out to the outside from this coil SC, a coil inner peripheral side fixed core (cylindrical stator core S2, magnetic resistance part) for forming a magnetic path radially inward of the coil SC, a coil outer peripheral side fixed core (cylindrical yoke S3 with a bottom) for forming a magnetic path radially outward of the coil SC, and an external connection connector for making a connection between the coil SC and an external circuit (external power and external control circuit: TCU).

The external connection connector includes a pair of coil terminals (connector terminals: terminals BT before formation, terminals MT during formation, terminals AT after formation) that are arranged (set) to project from an outer surface (hereinafter referred to as a yoke upper surface 5) of a bottom wall portion 4 of the yoke S3 toward the outside of the yoke S3, a terminal holder (hereinafter referred to as a holder 6) for housing and holding the after-formation terminal AT, and an annular clip for fixation (hereinafter referred to as clips 7) for fixing the holder 6 to the yoke upper surface 5. For the clips 7, there are provided boss fitting holes 10 through which fitting bosses 9 formed near an insertion hole 8 of the bottom wall portion 4 of the yoke S3 pass in their axial directions (fitting directions) and in which the fitting bosses 9 are respectively fitted. A holder fixing tool such as an annular waved washer may be used instead of the clip 7.

A pair of terminals BT, MT, AT is a tuning fork type parallel terminal with central axes of its tuning fork parts arranged (set) in parallel with each other on the yoke upper surface 5 of the yoke S3. The after-formation terminal AT is obtained by a punching formation of a metallic thin plate (metal material) having a conductive property by a pressing device or the like. The after-formation terminals AT include preliminary bent parts (preliminary bent part before bending formation) 11 which are bent at the same time as the punching process, and bent parts 12, 13 which are bent after the punching formation. For the after-formation terminal AT, there are integrally provided an internal connection part (inner conductor connection terminal: hereinafter referred to as a connection terminal 14) having a quadrangular shape in cross-section (rod shaft shape), an external connection part having a shape of a flat plate (outer conductor connection terminal: hereinafter referred to as a tuning fork terminal 15), and connection parts 21, 22 having quadrangular shapes in cross-section (rod shaft shapes). Details of the external connection connector will be described later.

The plunger S1 is a magnetic component constituting a magnetic circuit which is formed upon energization of the coil SC, and is a movable core (moving core) that can slidably reciprocate in the stator core S2 in its axial direction. This plunger S1 is a magnetic movable body having a cylindrical shape made of magnetic metal (ferromagnetic material such as iron) excited (magnetized) upon energization of the coil SC. The shaft is a connecting part that is in contact with one end surface of the plunger S1 in its axial direction to connect together the spool and the plunger S1.

The coil SC is a magnetic flux generating means (magnetic force generating means) for generating magnetic force that attracts the plunger S1 upon supply of electric power (upon energization). Upon energization of the coil SC, there is formed a magnetic circuit along which the magnetic fluxes intensively pass through the plunger S1, the stator core S2, and the yoke S3. The coil SC drives the spool, the shaft, and the plunger S1 toward one side (front side) in the axial direction of the sleeve and the spool by magnetic force. The coil SC is a solenoid coil with a conducting wire with an insulating coated layer wound multiple times around the bobbin 2 made of synthetic resin having insulation properties. The coil SC includes a coil part wound on the bobbin 2, and the pair of coil lead wires 1 pulled out from a winding-start end portion and a winding-end end portion of this coil part.

The pair of coil lead wires 1 is a conductor (electric conduction) which is formed into the coil SC wound on the bobbin 2, i.e., between a pair of flanged parts and around an outer periphery of a cylindrical part, and is connected to the external circuit (external power and external control circuit: TCU) via a terminal (external connection terminal) AT of the external connection connector. An intermediate part of this coil lead wire 1 is inserted through a slit formed in one flanged part 2a of the bobbin 2 and a boss part 2b connected to the one flanged part 2a to be taken out to the outside of the bobbin 2 (outside of the yoke S3).

The pair of coil lead wires 1 includes first projecting portions that project from the one flanged part 2a of the bobbin 2 to be inserted through the slit of the boss part 2b. These first projecting portions are taken out to the outside of the yoke S3 through the insertion hole 8 formed through the bottom wall portion 4 of the yoke S3. A second projecting portion projecting from the bottom wall portion 4 of the yoke S3 and an outer surface of the boss part 2b of the bobbin 2 includes a binding part that is bound spirally around the connection terminals 14 of the before-formation terminals BT, and a lead wire terminal part that is fusing-joined to each connection terminal 14 of the before-formation terminals BT.

The bobbin 2 is formed integrally from synthetic resin (mold resin material) having insulation properties. A conducting wire with the insulating coated layer is wound multiple times between the pair of flanged parts of this bobbin 2 and around the outer periphery of the cylindrical part of the bobbin 2. The boss part 2b that functions as a lead wire holder for guiding the intermediate part of the coil lead wire 1 is provided for the one flanged part 2a of the bobbin 2. A coil accommodating space for accommodating the coil SC is formed between the pair of flanged parts and around the outer periphery of the cylindrical part.

Through drawing formation of a magnetic steel plate by a pressing device or the like, the yoke S3 is formed into a cylindrical shape with a bottom with one end side of its cylindrical part (spool valve side) opened and with the other end side (holder side) of the cylindrical part closed by the bottom wall portion 4 having a circular plate. Along with the coil SC, the plunger S1, and the stator core S2, this yoke S3 constitutes the magnetic circuit. The yoke S3 is disposed to surround the coil SC in its circumferential direction. Inside this yoke S3, there is formed a solenoid accommodating space that accommodates linear solenoid component parts other than the yoke S3 (e.g., the coil SC, the bobbin 2, the shaft, the plunger S1, and the stator core S2).

A cylindrical opening on one end side of the cylindrical part of the yoke S3 is crimping-joined to an annular flange of the sleeve. The insertion hole 8 having a circular arc shape, through which the first projecting portions of the pair of coil lead wires 1 are inserted, is provided for the bottom wall portion 4 on the other end side of the cylindrical part of the yoke S3. This insertion hole 8 passes through the bottom wall portion 4 in the same direction as the center axis line direction of the solenoid (coil) (thickness direction of the bottom wall portion 4) to communicate between an inner surface (yoke bottom face) and an outer surface (yoke upper surface 5) of the bottom wall portion 4.

Figure 5A:
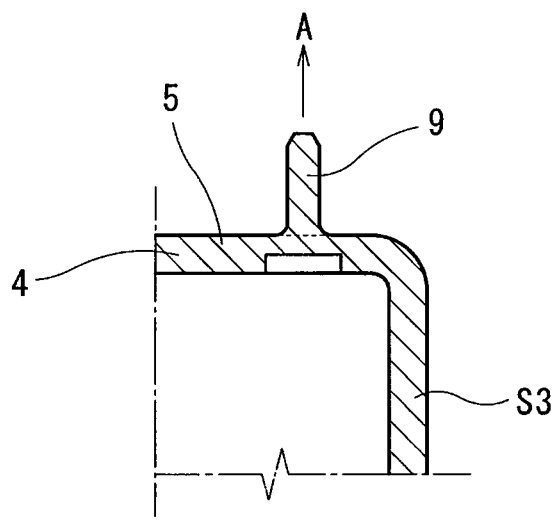
FIG. 5A is a sectional view illustrating a concrete example of a boss which is integrated into a yoke upper surface according to the first embodiment.
Figure 5B:
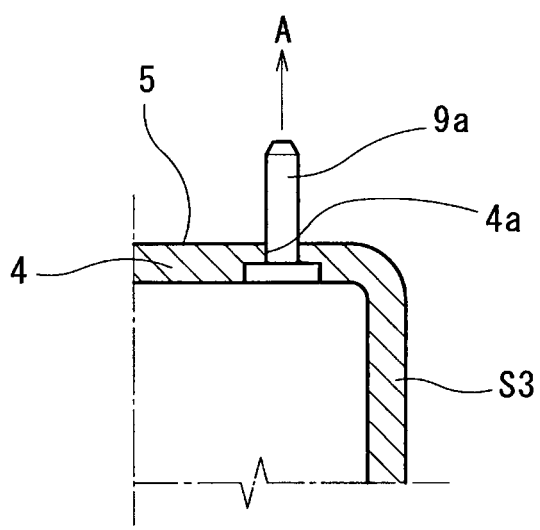
FIG. 5B is a sectional view illustrating a concrete example of a boss which is integrated into the yoke upper surface of the first embodiment.

The fitting bosses 9 projecting from the yoke upper surface 5 in the central axis direction (A) of the solenoid (coil) are integrally formed on the bottom wall portion 4 of the yoke S3. These fitting bosses 9 are integrated with the bottom wall portion 4 of the yoke S3. The fitting bosses 9 are formed integrally with the bottom wall portion 4 of the yoke S3 by, for example, extrusion formation to project from the yoke upper surface 5 and to arranged along a direction of attachment of the holder 6 to the yoke upper surface 5. The fitting bosses 9 may be configured as a different component (metal product) from the yoke S3. For example, as illustrated in FIG. 5B, a fitting pin 9a having a T-shape in section which is press-fitted into a press-fitting hole 4a formed through the bottom wall portion 4 of the yoke S3 may be employed for the fitting boss 9.

Details of the external connection connector of the present embodiment will be described in reference to FIGS. 1A to 5B. The external connection connector includes the after-formation terminal AT electrically connecting the pair of coil lead wires 1 and the external circuit, the angulate cylindrical holder 6 extended in a direction of fitting to the counterpart connector (connector connecting direction), and the clips 7 press-fitted around the fitting bosses 9. The after-formation terminal AT is a metallic conductor plate such as copper alloy or aluminum alloy, and its front surface (and rear surface) is plated with tin. The before-formation terminals BT include a proximal end part that is fixed (embedded and held) inside the bobbin 2 (in the boss part 2b of the bobbin 2) through insertion by a mold resin material after the punching formation.

The connection terminals 14 that project from the outer surface of the boss part 2b of the bobbin 2 and that project into the outside of the yoke S3 through the insertion hole 8 formed through the bottom wall portion 4 of the yoke S3 are respectively provided on the proximal end sides of the after-formation terminals AT. The connection terminal 14 includes a lead wire binding part 31 for binding the coil lead wire 1, a contact part (flat surface part) 32 having a quadrangular shape in cross-section that is extended from this lead wire binding part 31, and a folded piece 33 that is bent to fold back to this contact part 32. Spiral guide grooves for spirally binding bound parts of the pair of coil lead wires 1 are provided for the lead wire binding parts 31. Respective lead wire terminal parts of the pair of coil lead wires 1 are conductively joined (electrically connected) to the connection terminals 14 by fusing-joining.

The tuning fork terminals 15, each of which is fitted and connected to a tab terminal (male terminal) of a counterpart terminal 50 housed and held by the counterpart connector, are provided respectively for distal end sides of the after-formation terminals AT. The tuning fork terminal 15 is a connector terminal (female terminal) including arm-shaped sandwiching pieces 41, 42 for clamping the tab terminal of the counterpart terminal 50 to be in contact therewith. Between the sandwiching pieces 41, 42, this tuning fork terminal 15 includes a slot 43 into which the tab terminal of the counterpart terminal 50 is inserted from its opening side toward rear side. A proximal end part (base part) 44 of the tuning fork terminal 15 is provided on the rear side of this slot 43.

In the terminal BT before the bending formation illustrated in FIG. 1A, the slot opening side of the tuning fork terminal 15 is directed in the central axis direction (A) of the solenoid (coil). Thus, the opening of the slot 43 is opened in the central axis direction (A) of the solenoid (coil). As for the terminal AT after the bending formation illustrated in FIG. 1 C, the slot opening side of the tuning fork terminal 15 is directed in a direction of the insertion of the tab terminal of the counterpart terminal 50 (connector fitting direction, connector connecting direction), i.e., a solenoid (coil) central axis perpendicular direction (B) that is perpendicular to the central axis direction (A) of the solenoid (coil). Thus, the opening of the slot 43 is opened in the solenoid (coil) central axis perpendicular direction (B).

The after-formation terminal AT includes the preliminary bent part 11 and the bent parts 12, 13. The preliminary bent part 11 is a bent part where the bending formation of a predetermined bending angle is performed beforehand on the connection parts 21, 22 before the bending formation of the terminal MT, AT (e.g., at the same time as the punching formation). The bent part 12 is a first bent part where the bending formation of a predetermined bending angle is performed on each connection part 22 of the before-formation terminals BT. The bent part 13 is a second bent part where the bending formation of a predetermined bending angle is performed on the connection parts 21, 22 of the during-formation terminal MT.

For each of the terminals BT, MT, AT, the connection parts 21, 22 for integrating the connection terminal 14 and the tuning fork terminal 15 are provided at an intermediate part between an end of the connection terminal 14 and the proximal end part 44 of the tuning fork terminal 15. Accordingly, the after-formation terminal AT is formed integrally from one metal material from its proximal end side to distal end side. Between the connection part 21 and the connection part 22, there is provided a bending axis (preliminary bent part 11) that is bent beforehand at the same time as the punching formation or after the punching formation so that the terminal can be inserted through the circular arc-shaped insertion hole 8 after the punching formation. This bending axis is formed in a plate width direction perpendicular to the thickness direction on an upper side surface (front surface, inner surface) of a part of the connection part 22 on the connection part 21-side in FIGS. 1A to 1C.

The connection part 22 is provided to project perpendicular to the connection part 21 that is extended from an end of the connection terminal 14 in the same direction as the connection terminal 14 before the bending formation. For this connection part 22, there is provided a bending axis (bent part 12) where the proximal end part 44 of the tuning fork terminal 15 is bent at a predetermined bending angle relative to the connection part 22 at the time of the first bending formation. This bending axis is formed in a plate width direction perpendicular to the thickness direction on an upper side surface (front surface, inner surface) of a part of the connection part 22 on the proximal end part 44-side in FIGS. 1A to 1C. For the connection part 21, there is provided a bending axis (bent part 13) where the tuning fork terminal 15 and the connection parts 21, 22 are bent at a predetermined bending angle (e.g., at a right angle) relative to the end of the connection terminal 14 at the time of the second bending formation. This bending axis is formed in a plate width direction perpendicular to the thickness direction on an upper side surface (front surface, inner surface) of a part of the connection part 22 on the proximal end side (on the connection terminal 14-side) in FIGS. 1A to 1C.

The holder 6 is configured by integral molding from a mold resin material (synthetic resin) having insulation properties. This holder 6 is fixed (set) on the yoke upper surface 5 after the bending formation of terminals AT. The holder 6 has a function as an angulate cylindrical connector case 51 to which the counterpart connector is fitted. This holder 6 includes therein a pair of terminal accommodating recessed parts (terminal accommodating holes) 52 for respectively housing and holding the tuning fork terminals 15 of the after-formation terminals AT, and a pair of terminal accommodating recessed parts (terminal accommodating holes) 53 for respectively housing and holding the tab terminals of a pair of counterpart terminals. The pair of terminal accommodating recessed parts 52 and the pair of terminal accommodating recessed parts 53 are provided to perpendicularly cross.

The terminal accommodating recessed parts 52 open on their one end sides, and include openings (tuning fork terminal insertion openings) for inserting the tuning fork terminals 15 of the after-formation terminals AT respectively into the terminal accommodating recessed parts 52 at the time of attachment of the holder 6 to the yoke upper surface 5. For this opening, there is provided a guide groove 54 for guiding the tuning fork terminal 15 into a predetermined position of the terminal accommodating recessed part 52. A taper guide surface whose opening area becomes small gradually from the opening side of the groove 54 toward the rear side (terminal accommodating recessed part 52-side) is provided on this guide groove 54.

The terminal accommodating recessed parts 53 open on their one end sides, and include openings (tab terminal insertion openings) for inserting the tab terminals of the counterpart terminals respectively into the terminal accommodating recessed parts 53 at the time of fitting of the counterpart connector to the connector case 51. For this opening, there is provided a guide groove 55 for guiding the tab terminal into a predetermined position of the terminal accommodating recessed part 53. A taper guide surface whose opening area becomes small gradually from the opening side of the groove 54 toward the rear side (terminal accommodating recessed part 53-side) is provided on this guide groove 55. A partition wall 56 that divides the case 51 between the pair of terminal accommodating recessed parts 52 is provided in the connector case 51.

At the yoke S3-side open end of the holder 6 (angulate cylindrical end portion 57), a pair of flanges 60 are provided to project from outer surfaces of side walls of the holder 6 into the outside in a surface direction of the yoke upper surface 5. Mounting seats in contact with the yoke upper surface 5 are provided for angulate cylindrical end portions 55 and the flanges 60. Boss insertion holes 61, through which the fitting bosses 9 of the yoke S3 are inserted, are provided respectively for the flanges 60. The clips 7 respectively include the boss fitting holes 10 fitted around the fitting bosses 9 of the yoke S3, and slits extending radially from these boss fitting holes 10. Through their press-fitting into the fitting bosses 9, these clips 7 fix the holder 6 on the yoke upper surface 5 of the yoke S3.

A method for the attachment according to the first embodiment will be described below. A procedure for attaching the external connection connector on the yoke upper surface 5 of the linear solenoid LS of the present embodiment will be described.

First, by insert-molding of the proximal end part of the before-formation terminal BT in the boss part 2*b* of the bobbin 2, the proximal end part of the terminal BT is fixed to the bobbin 2. Next, the bound parts of the pair of coil lead wires 1 are spirally bound around the lead wire binding parts 31 of the connection terminals 14 of the terminals BT. Then, the respective lead wire terminal parts of the pair of coil lead wires 1 and the connection terminals 14 of the terminals BT are fusing-joined together.

The fusing-joining is a terminal connection method including the following procedures: each lead wire terminal part of the pair of coil lead wires 1 is inserted between the contact part of the proximal end side of the terminal BT and the folded piece 33; then, the folded piece 33 is plastically-deformed by a punch or the like to bend the piece 33 such that the folded piece 33 folds back in a U-shape; next, a pair of fusing electrodes are brought into contact with the entire connection terminal 14 including the contact part 32 and the folded piece 33 from both sides of the terminal 14 in its thickness direction; through energization of the fusing electrodes with the terminal 14 pressurized, the insulating coated layer on each lead wire terminal part of the pair of coil lead wires 1 is removed (fusion elimination); and as a result, a conduction state (electric connection) between the lead wire terminal parts of the pair of coil lead wires 1 and connection terminals 14 of the terminals BT is obtained.

Subsequently, the coil SC, the bobbin 2, and so forth are accommodated in an internal space (solenoid accommodating space) of the yoke S3. Next, respective lead wire terminal parts of the pair of coil lead wires 1 are taken out to the outside of the yoke upper surface 5 through the insertion hole 8. Then, the before-formation terminals BT projecting in the central axis direction (A) of the solenoid (coil) from the yoke upper surface 5 are set between a die and punch of a first bending formation device sequentially or simultaneously, and a bending load is applied to the bending axis (bent part 12) of each connection part 22 of the terminals BT by the punch. Accordingly, the proximal end part 44 of the tuning fork terminal 15 is bent at a predetermined bending angle relative to the connection part 22 at the bending axis (bent part 12) of each connection part 22 of the before-formation terminals BT. As a result, the during-formation terminals MT are produced (formed) (first bending formation process: first bending process).

Figure 1C:
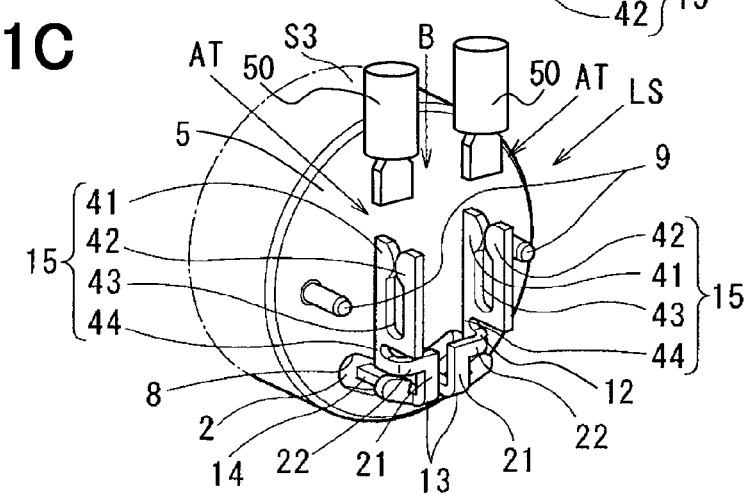
FIG. 1C is a diagram illustrating the bending process of the terminal of the linear solenoid of the first embodiment.
Figure 2:
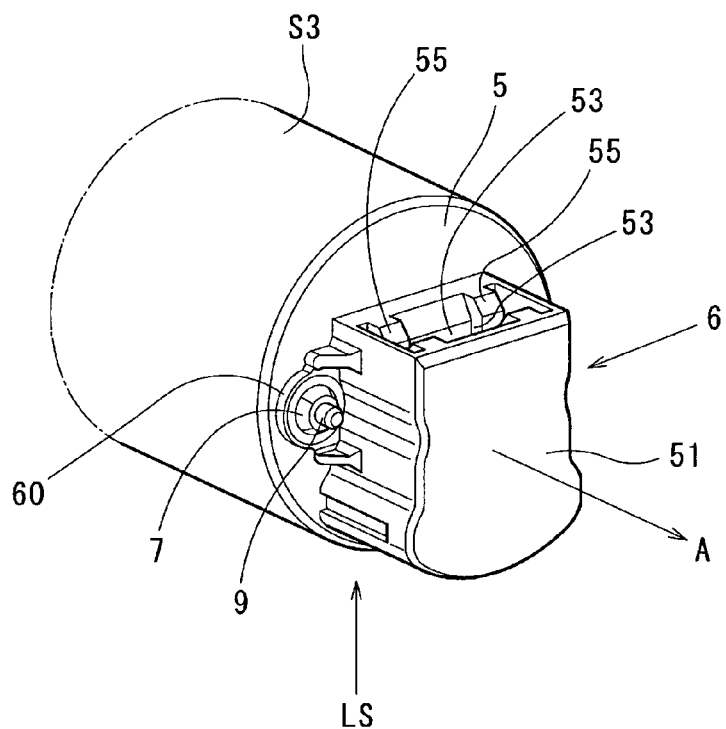
FIG. 2 is a perspective view illustrating a state in which a holder is attached to a yoke of the linear solenoid of the first embodiment.
Figure 3:
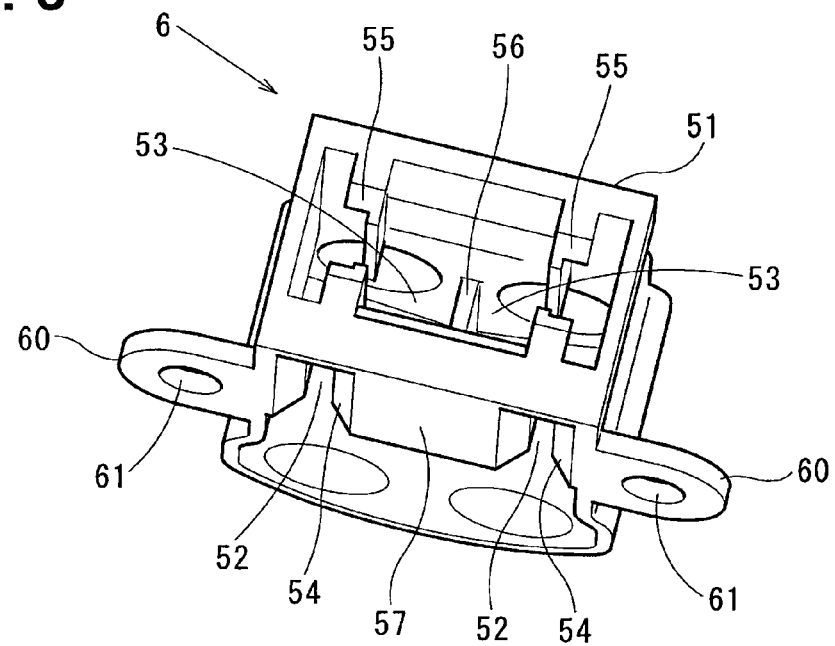
FIG. 3 is a perspective view illustrating only the holder of the first embodiment.
Figure 4A:
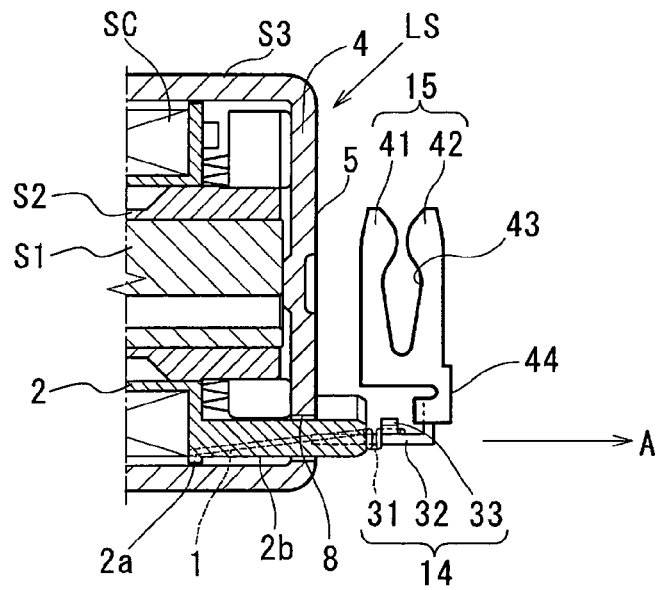
FIG. 4A is a sectional view illustrating a structure of the terminal of the linear solenoid of the first embodiment.
Figure 4B:
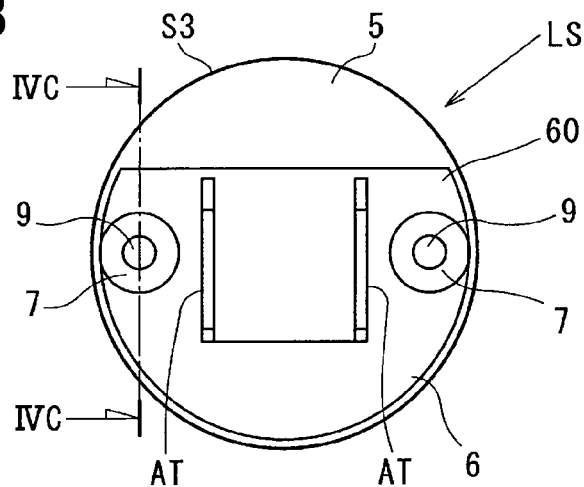
FIG. 4B is a plan view illustrating a main feature of the linear solenoid of the first embodiment.
Figure 4C:
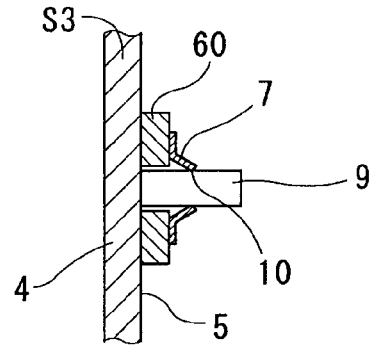
FIG. 4C is a sectional view taken along a line IVC-IVC in FIG. 4B.

Next, after the above first bending formation, the during-formation terminals MT are set between a die and punch of a second bending formation device sequentially or simultaneously, and a bending load is applied to the bending axis (bent part 12) of each connection part 22 of the terminals MT by the punch. Accordingly, the tuning fork terminal 15 and the connection parts 21, 22 are bent at a predetermined bending angle (e.g., at a right angle) relative to the end of the connection terminal 14 at the bending axis (bent part 13) of each connection part 21 of the during-formation terminals MT. As a result, the after-formation terminals AT are produced (formed) (second bending formation process: second bending process). Through the above two-time bending, in the terminals BT, the slot opening sides of the tuning fork terminals 15 are directed in the central axis direction (A) of the solenoid (coil) before the bending formation as illustrated in FIG. 1A; and the slot opening sides of the tuning fork terminals 15 can be directed in the solenoid (coil) central axis perpendicular direction (B) that is perpendicular to the central axis direction (A) of the solenoid (coil) after the bending formation as illustrated in FIG. 1C.

Subsequently, the boss insertion holes 61 formed through the flanges 60 of the holder 6 are fitted respectively around the pair of fitting bosses 9 which are integrated with the bottom wall portion 4 of the yoke S3 to attach the holder 6 on the yoke upper surface 5. Following this, by press-fitting the clips 7 around the fitting bosses 9 projecting toward the outside from the flanges 60 of the holder 6, the holder 6 is fixed on the yoke upper surface 5. The terminals AT, particularly, the tuning fork terminals 15, projecting from the yoke upper surface 5 in the central axis direction (A) of the solenoid (coil), are respectively accommodated in the terminal accommodating recessed parts 52 through the guide grooves 54 of the holder 6. As above, at the time of attachment of the holder 6 to the yoke upper surface 5, even if the tuning fork terminals 15 of the after-formation terminals AT are positionally shifted to some extent relative to the terminal accommodating recessed parts 52, the tuning fork terminals 15 are guided into the central parts of the guide grooves 54 respectively by the taper guide surfaces provided for the guide grooves 54 of the holder 6. Accordingly, each tuning fork terminal 15 is guided to the central part (proper position) of the terminal accommodating recessed part 52. As a result, the state of respective connections between the tab terminals of the counterpart terminals and the tuning fork terminals 15 of the after-formation terminals AT is made stable.

Effects of the first embodiment will be described below. As above, in the terminal structure for the linear solenoid LS in the electromagnetic hydraulic control valve of the present embodiment, the connection terminal 14 and the tuning fork terminal 15 are configured by an integral component. Thus, the terminal AT, in which the connection terminal 14 and the tuning fork terminal 15 are integrated, is employed. The bending formation of a predetermined bending angle is performed on the intermediate part (bent parts 12, 13) between the connection terminal 14 and the tuning fork terminal 15 of the before-formation terminal BT projecting from the yoke upper surface 5 toward the outside in the coil central axis direction (A).

Specifically, in the before-formation terminal BT projecting from the yoke upper surface 5 toward the outside in the coil central axis direction (A), the two-time bending formation is carried out at the intermediate part (bent parts 12, 13) between the connection terminal 14 and the tuning fork terminal 15. Accordingly, the connection terminal 14 and the tuning fork terminal 15 of the after-formation terminal AT can be integrated. As a result, a connection structure (or connecting operation) between the first terminal 107 and the second terminal 108, which is required for the conventional solenoid, becomes unnecessary. Therefore, energization (conduction) reliability at an internal conduction part (internal connection part) between the connection terminal 14 and the tuning fork terminal 15 of the after-formation terminal AT can be easily secured. Moreover, the connecting operation (e.g., welding operation or crimping operation) of conductively-joining the first terminal 107 and the second terminal 108 as in the conventional solenoid becomes unnecessary. Accordingly, productivity can be improved to reduce the manufacturing costs.

The guide grooves 54 having the taper guide surfaces are provided respectively for the openings (tuning fork terminal insertion openings) of the holder 6 which is fixed to the yoke upper surface 5 after the bending formation of the pair of terminals AT Accordingly, a position shift of the tuning fork terminal 15 of the after-formation terminal AT can be absorbed by the guide groove 54. As a result, the tuning fork terminal 15 of the after-formation terminal AT can be easily positioned. By setting an entry size of the guide groove 54 at its optimum value, the tuning fork terminal 15 of the after-formation terminal AT can be guided to a designated position where the terminal 15 can be reliably electrically-connected to the tab terminal of the counterpart terminal.

The fitting bosses 9 are provided to project from the yoke upper surface 5 and to be arranged along the direction of attachment of the holder 6. The boss insertion holes 61 which are fitted respectively to the fitting bosses 9 are provided respectively for the flanges 60 of the holder 6. Accordingly, the holder 6 can be attached to the yoke upper surface 5 without a position shift. As a result, the amount of the position shift relative to the designated position for the tuning fork terminals 15 housed and held in the holder 6 can be made small. Consequently, the energization (conduction) reliability at a conductively joining part (external connection part) between the tuning fork terminal 15 of the after-formation terminal AT and the tab terminal of the counterpart terminal can be easily secured. Thus, by providing more than one fitting boss 9, displacement of the holder 6 in the rotation direction on the yoke upper surface 5 (flat surface) is limited so that accuracy of the positions of the tuning fork terminals 15 with respect to the terminal accommodating recessed parts 52 can be improved. By increasing a projection height of the fitting boss 9, insertion of the clip 7 used for fixing the holder 6 and confirmation of attachment of the holder 6 can be facilitated.

By fitting (passing) the fitting bosses 9 respectively through the insertion holes 61 of the flanges 60 of the holder 6, the tuning fork terminals 15 and the holder 6 are positioned relative to the yoke upper surface 5. Then, the holder 6 is fixed to the yoke upper surface 5 by the clips 7. Through adjustment of a positional relationship between the fitting bosses 9 on the yoke upper surface 5 and the insertion holes 61 of the holder 6, the accuracy of the positions of the tuning fork terminals 15 with respect to the terminal accommodating recessed parts 52 can be improved. Consequently, the energization (conduction) reliability at a conductively joining part (external connection part) between the tuning fork terminal 15 of the after-formation terminal AT and the tab terminal of the counterpart terminal can be easily secured. Furthermore, an inserting load of the clip 7 for fixing a fastened portion to the fitting boss 9 which is integrated with the yoke upper surface 5 of the yoke S3 is sufficiently small with respect to a compressive load when the boss itself is compressed and extended by applying pressure to fix the fastened portion. Therefore, flatness of the yoke upper surface 5 is not deteriorated. Accordingly, delivery and receipt of magnetic field lines between the components such as the plunger S1, the stator core S2, and the yoke S3 can be maintained at a height level.

In the conventional linear solenoid, the insertion hole 113 is formed through the upper surface of the yoke 105, and the terminal holder 109 is snap-fit joined to the bottom wall portion of the yoke 105 such that the resilient engagement piece 114 projecting from the terminal holder 109 is hooked to the insertion hole 113. Accordingly, foreign substances may enter through the insertion hole 113 of the yoke 105 into the solenoid accommodating space which is an internal space of the yoke 105, particularly, into a sliding clearance between the plunger 101 and the stator cores 102, 103. If foreign substances enter into the sliding clearance of the linear solenoid as described above, there is an issue that a defect (e.g., stick or lock) of sliding of the plunger 101 is caused. On the other hand, in the linear solenoid LS of the present embodiment, the insertion hole 113 for snap-fit joining is not formed through the bottom wall portion 4 of the yoke S3. Accordingly, the entry of foreign substances from the yoke upper surface 5 into the internal space (solenoid accommodating space) of the yoke S3 can be prevented. As a result, a defect (e.g., stick or lock) of sliding of the plunger S1 which is slidably supported in the stator core S2 is not caused.

In the conventional linear solenoid, the method of fixing the terminal holder 109 to the yoke 105 is snap-fit joining. Accordingly, a space (dead space), into which the end part (snap fitting pawl part 115) of the resilient engagement piece 114 is inserted, is needed between the bottom wall portion 111 of the yoke 105 and the flanged part of the coil bobbin 117. Thus, there is concern for performance deterioration due to reduction of a performance space in the linear solenoid. For this reason, in the linear solenoid LS of the present embodiment, snap-fit joining is not employed for the method of fixing the holder 6 to the yoke S3. Specifically, as described above, for the method of fixing the holder 6 on the yoke upper surface 5, the boss insertion holes 61 of the holder 6 are fitted respectively around the fitting bosses 9 of the yoke S3, and the clips 7 are press-fitted and fixed respectively around the fitting bosses 9 projecting toward the outside from the flanges 60 of the holder 6. Accordingly, the holder 6 is positioned and fixed on the yoke upper surface 5 to eliminate the need for a dead space inside the yoke S3.

(Second Embodiment)

Figure 6A:
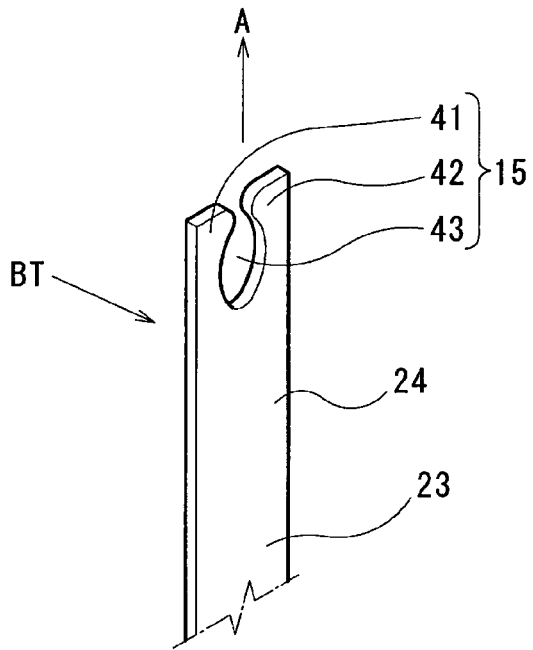
FIG. 6A is a diagram illustrating a bending process of a terminal of a linear solenoid in accordance with a second embodiment.
Figure 6B:
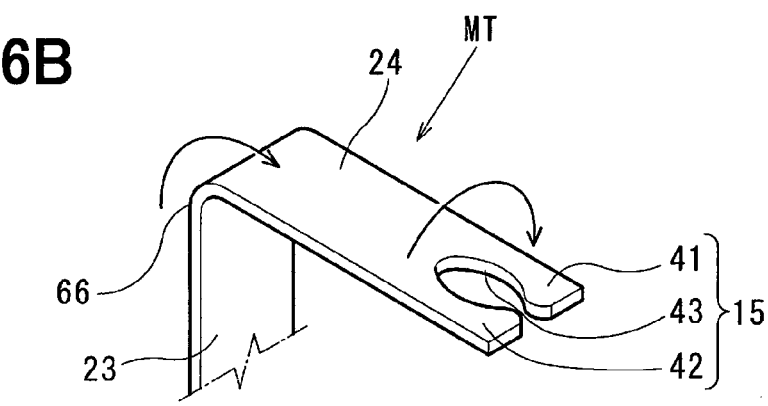
FIG. 6B is a diagram illustrating the bending process of the terminal of the linear solenoid of the second embodiment.
Figure 6C:
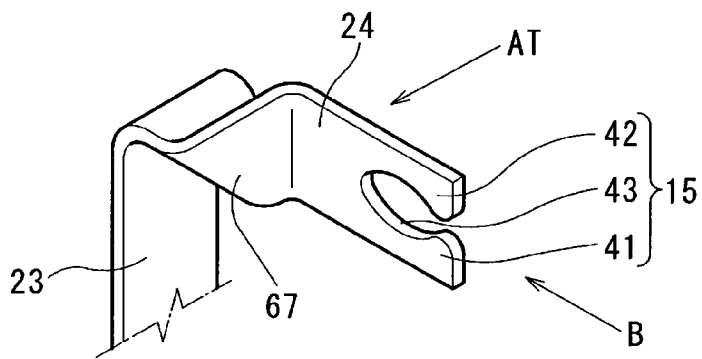
FIG. 6C is a diagram illustrating the bending process of the terminal of the linear solenoid of the second embodiment.

Configuration of a second embodiment will be described below. FIGS. 6A to 6C illustrate a terminal structure (second embodiment) of a linear solenoid to which the present disclosure is applied. The same reference numeral as the first embodiment indicates the same corresponding configuration or function, and its explanation will be omitted.

As illustrated in FIG. 6C, at an intermediate part (connection parts 23, 24) between a connection terminal 14 and a tuning fork terminal 15, an after-formation terminal AT of the present embodiment includes a bent part 66 on which bending formation of a predetermined bending angle is performed, and a twisted part 67 to which a twist of a predetermined bending angle is given.

A procedure for attaching an external connection connector on a yoke upper surface 5 of a linear solenoid LS of the present embodiment will be described. First, a before-formation terminal BT (see FIG. 6A) projecting from the yoke upper surface 5 in the central axis direction (A) of the solenoid (coil) is set between a die and punch of a bending formation device, and a bending load is applied to the bending axis (bent part 66) of each connection part 23 of the terminals BT by the punch. Accordingly, at the bending axis (bent part 66) of each connection part 23, 24 of the before-formation terminals BT, a proximal end part 44 of the tuning fork terminal 15 is bent at a predetermined bending angle relative to the connection part 23. As a result, a during-formation terminal MT is produced (formed) (bending formation process: bending process) as illustrated in FIG. 6B.

After the above-described formation, by twisting each connection part 24 of the during-formation terminals MT with the connection part 24 clamped by a jig of a twist formation device, a twisting load is applied to a twisted axis (twisted part 67) of each connection part 24 of the terminals MT. Accordingly, at the twisted axis (twisted part 67) of each connection part 24 of the during-formation terminals MT, the tuning fork terminal 15 is twisted relative to the connection part 24 at a predetermined twisting angle. As a result, the after-formation terminals AT are produced (formed) (twisting process) as illustrated in FIG. 6C. Through the above-described bending and twisting, a slot opening side of the tuning fork terminal 15 of the before-formation terminal BT is directed in the central axis direction (A) of the solenoid (coil) before the formation as illustrated in FIG. 6A; but after the formation, the slot opening side of the tuning fork terminal 15 of the after-formation terminal AT can be directed in the solenoid (coil) central axis perpendicular direction (B) that is perpendicular to the central axis direction (A) of the solenoid (coil) as illustrated in FIG. 6C.

In the before-formation terminal BT projecting from the yoke upper surface 5 toward the outside in the coil central axis direction (A), the bending formation is performed one time on the intermediate part between the connection terminal 14 and the tuning fork terminal 15, and then, a twist is further applied. Accordingly, in the after-formation terminal AT, the connection terminal 14 and the tuning fork terminal 15 can be integrated. As a result, a connection structure (or connecting operation) between the first terminal 107 and the second terminal 108, which is required for the conventional solenoid, becomes unnecessary. Therefore, energization (conduction) reliability at an internal conduction part (internal connection part) between the connection terminal 14 and the tuning fork terminal 15 of the after-formation terminal AT can be easily secured. As above, the terminal structure for the linear solenoid LS of the present embodiment produces a similar effect to the first embodiment.

(Third Embodiment)

Configuration of a third embodiment will be described below. FIGS. 7A to 7C illustrate a terminal structure (third embodiment) for a linear solenoid to which the present disclosure is applied. The same reference numeral as first and second embodiments indicates the same corresponding configuration or function, and its explanation will be omitted.

As illustrated in FIG. 7B, an after-formation terminal AT of the present embodiment includes first and second bent parts 71, 72 on which bending formation of a predetermined bending angle is performed, at an intermediate part (connection parts 23, 24) between a connection terminal 14 and a tuning fork terminal 15.

A procedure for attaching an external connection connector on a yoke upper surface 5 of a linear solenoid LS of the present embodiment is similar to the first embodiment, and thus its explanation will be omitted. Through the above-described two-time bending formation, before the formation and during the formation, a slot opening side of the tuning fork terminal 15 of before-formation and during-formation terminals BT, MT is directed in the central axis direction (A) of the solenoid (coil) as illustrated in FIG. 7A; but after the formation, the slot opening side of the tuning fork terminal 15 of the after-formation terminal AT can be directed in the solenoid (coil) central axis perpendicular direction (B) that is perpendicular to the central axis direction (A) of the solenoid (coil) as illustrated in FIG. 7B.

As illustrated in FIG. 7C, the after-formation terminal AT of the present embodiment includes a bent twisted part 74 to which a twist of a predetermined bending angle is given at the same time as the bending formation of a predetermined bending angle at the intermediate part (connection part 73) between the connection terminal 14 and the tuning fork terminal 15. At the same time as the bending formation, a twist is given to the intermediate part (connection part 73) between the connection terminal 14 and the tuning fork terminal 15 of the after-formation terminal AT illustrated in FIG. 7C. As above, the terminal structure for the linear solenoid LS of the present embodiment produces a similar effect to the first and second embodiments.

(Fourth Embodiment)

Configuration of the fourth embodiment will be described below. FIGS. 8A to 8D illustrate a terminal structure (fourth embodiment) for a linear solenoid to which the present disclosure is applied. The same reference numeral as first to third embodiments indicates the same corresponding configuration or function, and its explanation will be omitted.

Figure 8A:
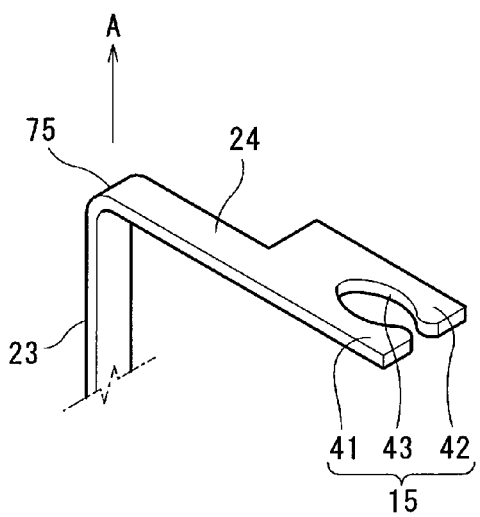
FIG. 8A is a diagram illustrating a bending process of a terminal of a linear solenoid in accordance with a fourth embodiment.
Figure 8C:
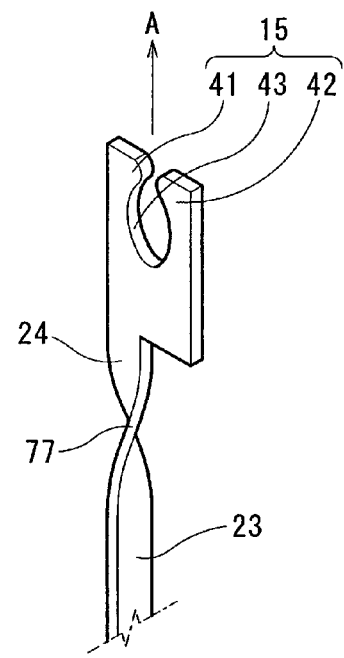
FIG. 8C is a diagram illustrating the bending process of the terminal of the linear solenoid of the fourth embodiment.
Figure 8B:
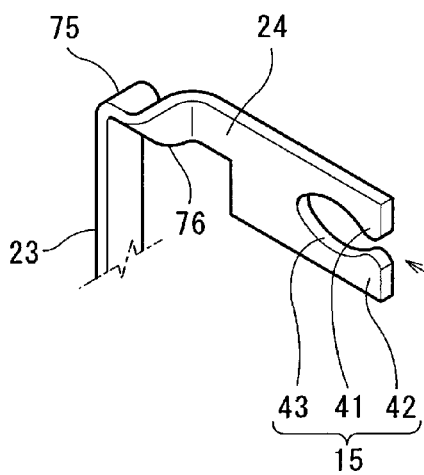
FIG. 8B is a diagram illustrating the bending process of the terminal of the linear solenoid of the fourth embodiment.

As illustrated in FIG. 8B, an after-formation terminal AT of the present embodiment includes a bent part 75 on which bending formation of a predetermined bending angle is performed, and a twisted part 76 to which a twist of a predetermined bending angle is given, at an intermediate part (connection parts 23, 24) between a connection terminal 14 and a tuning fork terminal 15. A procedure for attaching an external connection connector on a yoke upper surface 5 of a linear solenoid LS of the present embodiment is similar to the second embodiment, and thus its explanation will be omitted.

Figure 8D:
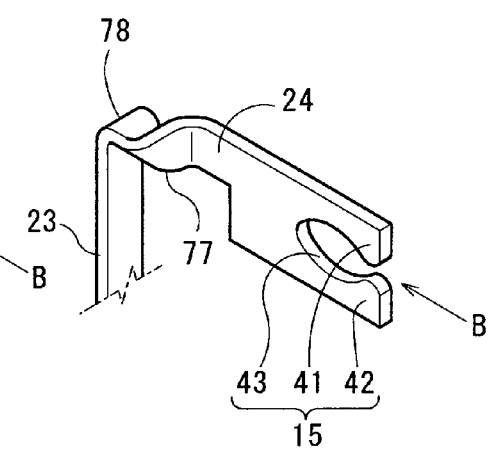
FIG. 8D is a diagram illustrating the bending process of the terminal of the linear solenoid of the fourth embodiment.
Figure 9:
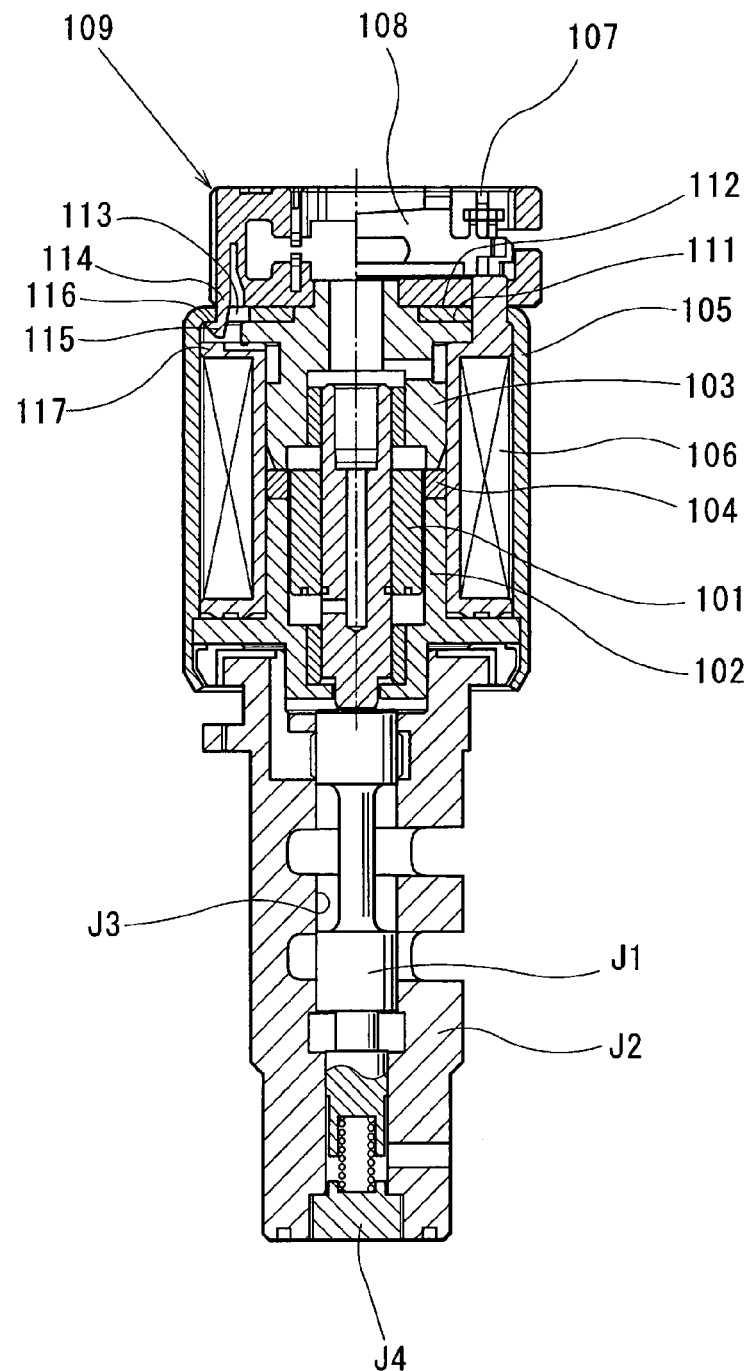
FIG. 9 is a sectional view illustrating a previously proposed electromagnetic spool control valve including a linear solenoid.

As illustrated in FIG. 8D, the after-formation terminal AT of the present embodiment includes a twisted part 77 to which a twist of a predetermined bending angle is given, and a bent part 78 on which bending formation of a predetermined bending angle is performed, at the intermediate part (connection parts 23, 24) between the connection terminal 14 and the tuning fork terminal 15.

The procedure for attaching the external connection connector on the yoke upper surface 5 of the linear solenoid LS of the present embodiment will be described below. First, by twisting a before-formation terminal BT projecting from the yoke upper surface 5 in the central axis direction (A) of the solenoid (coil) with the terminal BT clamped by a jig of a twist formation device, a twisting load is applied to a twisted axis (twisted part 77) of each connection part 24 of during-formation terminals MT. Accordingly, by twisting the tuning fork terminal 15 relative to the connection part 24 at a predetermined twisting angle at the twisted axis (twisted part 77) of each connection part 24 of the during-formation terminals MT, the during-formation terminals MT are produced (formed) (twisting process) as illustrated in FIG. 8C.

Next, after the above-described formation, the during-formation terminal MT is set between a die and punch of a bending formation device, and a bending load is applied by the punch to a bending axis (bent part 78) of each connection part 23 of the terminals BT. Accordingly, a proximal end part 44 of the tuning fork terminal 15 is bent at a predetermined bending angle relative to the connection part 23 at the bending axis (bent part 78) of each connection part 23, 24 of the before-formation terminals BT. As a result, the after-formation terminals AT are produced (formed) (bending formation process: bending process) as illustrated in FIG. 8D.

Through the above-described twisting and bending, a slot opening side of the tuning fork terminal 15 of the before-formation or during-formation terminal BT, MT is directed in the central axis direction (A) of the solenoid (coil) before the formation or during the formation as illustrated in FIGS. 8A and 8C; but after the formation, the slot opening side of the tuning fork terminal 15 of the after-formation terminal AT can be directed in the solenoid (coil) central axis perpendicular direction (B) that is perpendicular to the central axis direction (A) of the solenoid (coil) as illustrated in FIGS. 8B and 8D. As above, the terminal structure for the linear solenoid LS of the present embodiment produces a similar effect to the first to third embodiments.

Modifications of the above embodiments will be described. In the present embodiments, the solenoid of the present disclosure is applied to the linear solenoid LS (electromagnetic actuator) that drives the spool valve incorporated into the hydraulic control system for performing hydraulic control of the automatic transmission of an automobile. However, the solenoid of the present disclosure may be applied to a coil system such as an electric motor (motor), a generator (alternator), an electromagnetic switch, an ignition coil, or a transformer. A conductor connected to the coil may be a brush which is in pressing contact with a commutator electrically connected to a rotor coil of the motor. The conductor may be a brush which is in pressing contact with a collector ring (slip ring) electrically connected to a rotor coil of the alternator. A brush terminal obtained by integrating an internal connection part that is conductively-joined to the brush, and an external connection part that is fitted and connected to the counterpart terminal can be employed for the after-formation terminal.

In the present embodiments, the solenoid of the present disclosure is applied to the linear solenoid LS that drives the spool valve incorporated into the hydraulic control system for performing hydraulic control of the automatic transmission of an automobile. However, the solenoid of the present disclosure may be applied to a linear solenoid that drives a spool valve used for fluid pressure control, flow control, or flow passage switching control. The solenoid of the present disclosure may be applied to a linear solenoid that drives a spool valve which is a valving element of an electromagnetic oil passage control valve (OCV) used in a variable valve timing device (VVT) for changing opening and closing timing of an intake valve or exhaust valve of an engine. Instead of the spool valve, the present disclosure may be applied to a linear solenoid that drives a valve having another shape such as a ball valve, or poppet valve. The structure of the present disclosure may be applied to a movable core having an integral construction of the shaft and the plunger S1. The shaft may be configured from a magnetic material.

In the present embodiments, a direction of insertion of the counterpart terminal is set at the coil central axis perpendicular direction (B) that is perpendicular to the central axis direction (A) of the solenoid (coil). However, the direction of insertion of the counterpart terminal may be set at a direction that is different from the central axis direction (A) of the solenoid (coil), or at a different direction within a predetermined angle range (e.g., 85 degrees to 105 degrees) from the central axis direction (A) of the solenoid (coil).

To sum up, the solenoid LS in accordance with the above embodiments can be described as follows.

In the first aspect of the present disclosure, the internal connection part 14 and the external connection part 15 are configured by an integral component. Thus, the internal connection part 14 and the external connection part 15 are integrated. As a result of the application of bending and twisting to the intermediate part 21 to 24, 73 between the internal connection part 14 and the external connection part 15 of the before-formation terminal BT projecting from the upper surface 5 of the yoke S3 toward the outside in the coil central axis direction (A), the internal connection part 14 and the external connection part 15 are integrated. Accordingly, as opposed to the conventional solenoid in which the two components (first and second terminals 107, 108) are joined together, energization (conduction) reliability at the internal connection part 14 and the external connection part 15 of the terminal AT can be easily secured. Furthermore, the operation of conductively-joining of the first terminal 107 and the second terminal 108 as in the conventional solenoid becomes unnecessary. As a result, productivity can be improved to reduce the manufacturing costs.

In the seventh aspect of the present disclosure, the two-time bending formation is performed on the intermediate part 21 to 24 between the internal connection part 14 and the external connection part 15 of the before-formation terminal BT projecting from the upper surface 5 of the yoke S3 toward the outside in the coil central axis direction (A). Accordingly, the internal connection part 14 and the external connection part 15 can be integrated. As a result, a connection structure (or connecting operation) between the first terminal 107 and the second terminal 108, which is required for the conventional solenoid, becomes unnecessary. Thus, energization (conduction) reliability at the internal connection part 14 and the external connection part 15 of the terminal AT can be easily secured.

In the eighth aspect of the present disclosure, the bending formation is performed one time and then, a twist is further applied to the intermediate part 23, 24 between the internal connection part 14 and the external connection part 15 of the before-formation terminal BT projecting from the upper surface 5 of the yoke S3 toward the outside in the coil central axis direction (A). Accordingly, the internal connection part 14 and the external connection part 15 can be integrated. As a result, a connection structure (or connecting operation) between the first terminal 107 and the second terminal 108, which is required for the conventional solenoid, becomes unnecessary. Thus, energization (conduction) reliability at the internal connection part 14 and the external connection part 15 of the terminal AT can be easily secured.

In the ninth aspect of the present disclosure, a twist is applied and then the bending formation is performed one time on the intermediate part 23, 24 between the internal connection part 14 and the external connection part 15 of the before-formation terminal BT projecting from the upper surface 5 of the yoke S3 toward the outside in the coil central axis direction (A). Accordingly, the internal connection part 14 and the external connection part 15 can be integrated. As a result, a connection structure (or connecting operation) between the first terminal 107 and the second terminal 108, which is required for the conventional solenoid, becomes unnecessary. Thus, energization (conduction) reliability at the internal connection part 14 and the external connection part 15 of the terminal AT can be easily secured.

In the tenth aspect of the present disclosure, a twist is applied at the same time as the bending formation to the intermediate part 73 between the internal connection part 14 and the external connection part 15 of the before-formation terminal BT projecting from the upper surface 5 of the yoke S3 toward the outside in the coil central axis direction (A). Accordingly, the internal connection part 14 and the external connection part 15 can be integrated. As a result, a connection structure (or connecting operation) between the first terminal 107 and the second terminal 108, which is required for the conventional solenoid, becomes unnecessary. Thus, energization (conduction) reliability at the internal connection part 14 and the external connection part 15 of the terminal AT can be easily secured.

In the eleventh and twelfth aspects of the present disclosure, the guide groove 54 having a taper guide surface is provided for the opening (insertion opening for the external connection terminal AT into the accommodating hole 52) of the holder 6 that is attached on the upper surface 5 of the yoke S3. Accordingly, a position shift of the external connection part 15 of the after-formation terminal AT can be absorbed by the guide groove 54. As a result, the external connection part 15 of the after-formation terminal AT can be positioned.

In the thirteenth aspect of the present disclosure, the bosses 9, 9a are provided to project from the upper surface 5 of the yoke S3 and to be arranged along the direction of attachment of the holder 6; and the insertion holes 61, through which the bosses 9, 9a are respectively inserted, are provided for the holder 6. Accordingly, the holder 6 can be attached to the upper surface 5 of the yoke S3 without a position shift. As a result, the amount of the position shift relative to the designated position for the external connection parts 15 housed and held in the holder 6 can be made small. Therefore, energization (conduction) reliability at the external connection part 15 of the terminal AT can be easily secured.

In the fourteenth aspect of the present disclosure, by fitting (passing) the bosses 9, 9a respectively through the insertion holes 61 of the holder 6, the external connection parts 15 and the holder 6 are positioned relative to the yoke upper surface 5 of the yoke S3. After that, the holder 6 is fixed to the yoke upper surface 5 of the yoke S3 by the annular clips 7 (or annular waved washers or the like). Through adjustment of a positional relationship between the bosses 9, 9a on the upper surface 5 of the yoke S3 and the insertion holes 61 of the holder 6, the accuracy of the positions of the external connection parts 15 can be improved. Accordingly, energization (conduction) reliability at the external connection part 15 of the terminal AT can be easily secured.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A solenoid comprising:
   a coil;
   an after-formation terminal that includes:
   an internal connection part that is conductively-joined to a conductor from which the coil is formed, or to a conductor which is connected to the coil; and
   an external connection part that is fitted and connected to a counterpart terminal; and
   a yoke that has a cylindrical shape with a bottom and is configured to form a magnetic circuit together with the coil, wherein:
   the after-formation terminal is disposed at an upper surface of the yoke;
   the external connection part is configured integrally with the internal connection part;
   the after-formation terminal is obtained as a result of application of bending or twisting to a before-formation terminal, which projects outward from the upper surface of the yoke in a direction of a central axis of the coil;
   the after-formation terminal is formed through application of bending or twisting to an intermediate part between the internal connection part and the external connection part of the before-formation terminal;
   the after-formation terminal includes a first bent part and a second bent part at the intermediate part between the internal connection part and the external connection part;
   bending formation of a predetermined angle id performed on the first bent part in a thickness direction of the first bent part, the first bent part having a thickness in the thickness direction and having a width in a width direction, the thickness direction being generally perpendicular to the width direction, and the thickness being smaller that the width; and
   the second bent part is located on the internal connection part side of the first bent part and bending formation of a predetermined angle is performed on the second bent in a thickness direction of the second bent part, the second bent part having a thickness in the thickness direction and having a width in a width direction, the thickness direction being generally perpendicular to the width direction, and the thickness being smaller than the width.

2. The solenoid according to claim 1, wherein the before-formation terminal is provided by punching a metal material having a conductive property and by performing necessary bending formation on the material.

3. The solenoid according to claim 1, wherein the external connection part includes a slot from whose opening side into rear side the counterpart terminal is inserted.

4. The solenoid according to claim 3, wherein the opening side of the slot of the external connection part of the before-formation terminal is directed in the direction of the central axis of the coil.

5. The solenoid according to claim 3, wherein the opening side of the slot of the external connection part of the after-formation terminal is directed in a direction of the insertion of the counterpart terminal.

6. The solenoid according to claim 5, wherein the direction of the insertion of the counterpart terminal is a direction that is different from the direction of the central axis of the coil, or a coil central axis perpendicular direction that is perpendicular to the direction of the central axis of the coil.

7. The solenoid according to claim 1, wherein:
   the after-formation terminal includes a bent part and a twisted part at the intermediate part between the internal connection part and the external connection part;
   bending formation of a predetermined angle is performed on the bent part in a thickness direction of the bent part; and
   a twist of a predetermined angle is given to the twisted part in a thickness direction of the twisted part after the bending formation.

8. The solenoid according to claim 1, wherein:
   the after-formation terminal includes a twisted part and a bent part at the intermediate part between the internal connection part and the external connection part;
   a twist of a predetermined angle is given to the twisted part in a thickness direction of the twisted part; and
   bending formation of a predetermined angle is performed on the bent part in a thickness direction of the bent part after the twist.

9. The solenoid according to claim 1, wherein:
   the after-formation terminal includes a bent twisted part at the intermediate part between the internal connection part and the external connection part; and
   bending and twisting of a predetermined angle are performed at the same time on the bent twisted part in a thickness direction of the bent twisted part.

10. The solenoid according to claim 1, further comprising a holder that is attached on the upper surface of the yoke to accommodate and hold the after-formation terminal.

11. The solenoid according to claim 10, wherein:
    the holder includes:
    an accommodating hole that accommodates the external connection part; and
    a guide groove that is configured to guide the external connection part into the accommodating hole; and
    the guide groove includes a taper guide surface whose opening area becomes smaller gradually from its opening side toward rear side.

12. The solenoid according to claim 10, further comprising a plurality of bosses that are provided to project from the upper surface of the yoke and to be arranged along a direction of the attachment of the holder, wherein the holder includes a plurality of insertion holes, through which the plurality of bosses are respectively inserted.

13. The solenoid according to claim 12, further comprising a plurality of clips that respectively include a plurality of fitting holes, which are fitted respectively to the plurality of bosses, and that fix the holder on the upper surface of the yoke.

* * * * *